Figure 1:
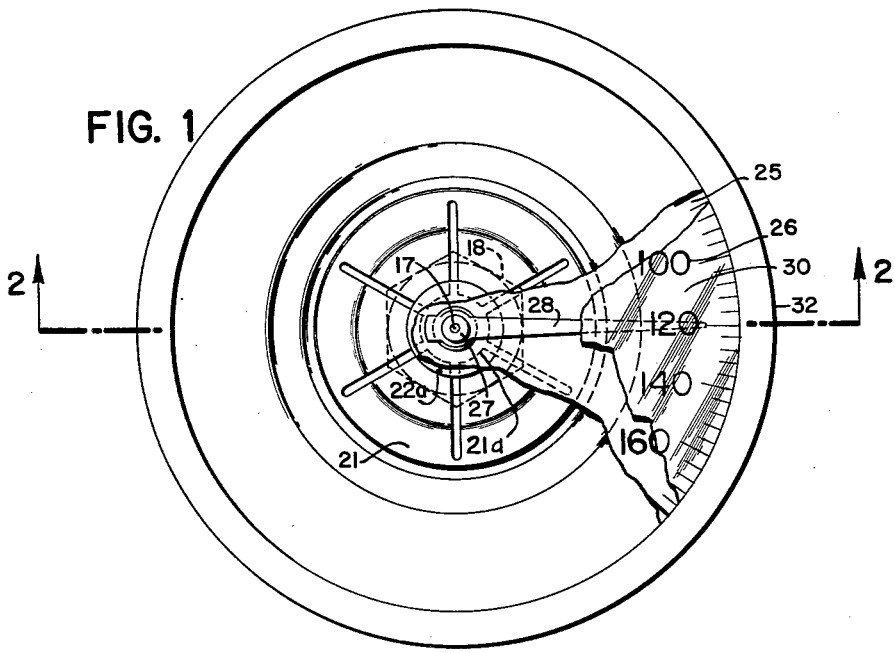

Feb. 25, 1964   R. W. FREEMAN ETAL   3,122,018
INSTRUMEMT WITH IMPROVED CALIBRATION ADJUSTMENT
Filed Feb. 19, 1962

INVENTORS
ROBERT W. FREEMAN
GEORGE F. HAGEMAN
BY
ATTORNEY

United States Patent Office 3,122,018
Patented Feb. 25, 1964

3,122,018
INSTRUMENT WITH IMPROVED CALIBRATION ADJUSTMENT
Robert W. Freeman, West Orange, and George F. Hageman, Union N.J., assignors to Daystrom Incorporated, Murray Hill, N.J., a corporation of Texas
Filed Feb. 19, 1962, Ser. No. 174,176
4 Claims. (Cl. 73—363.9)

This invention relates to instruments and more particularly to thermometer instruments of the type having a pointer radially movable with respect to a scale disposed about the axis of radial movement.

Instruments of the type which employ a pointer and scale arrangement for indicating temperature, pressure, moisture, and a great variety of other physical parameters are widely used for many applications. These applications fall broadly into two categories, one in which the instrument is more or less permanently fixed or installed and the other in which it is portable, such as for example, where it might be employed for general laboratory use.

The particular type of application for which the instrument is employed determines to a considerable degree its accuracy of measurement after a period of use. This is particularly true of thermometers which employ a bimetallic element. Accordingly, thermometers of this type which are installed in fixed position will generally exhibit better accuracy after a period of time since they are not subject to severe environmental conditions. On the other hand, portable thermometers require frequent recalibration since the jarring and shock to which they are subjected may considerably affect their accuracy, usually by altering the residual stresses in the bimetallic element.

In order to restore accuracy of measurement, portable thermometers must, of course, be recalibrated and this is conventionally accomplished by means of removing the front assembly from the thermometer case and employing a special tool to effect a movement of the scale with respect to the pointer. This manner of recalibration has existed for some time in the industry notwithstanding the fact that a special tool is required and that it is inconvenient and wasteful of time and since the instrument must be partly disassembled in order to accomplish the recalibration.

Accordingly, it is an object of this invention to afford adjustment of a pointer with respect to its associated radial instrument scale without any disassembly of the instrument.

Another object is to make possible the recalibration of instrument indicators of the type described without special tools.

Yet another object of the present invention is to afford simple and rapid adjustment or calibration of radially disposed instrument scalar indicators by use of a variety of common holding devices ordinarily available.

Figure 2:
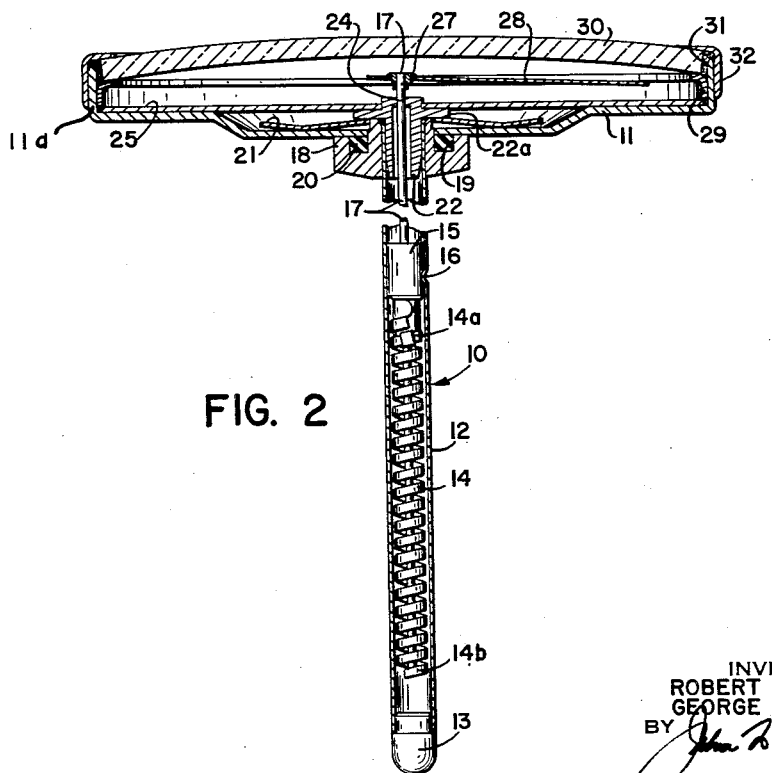

These and other objects, features and advantages of the invention will be best understood from a study of the following detailed description taken in conjunction with the claims and with the drawings in which:

FIGURE 1 is a front view showing portions of a thermometer having a radially disposed dial indicator constructed in accordance with the principles of the invention; and FIGURE 2 is a sectional side view thereof taken in the direction of the arrows 2—2 in FIGURE 1.

Referring now to the figures, there is shown for illustrative purposes a thermometer of the bimetallic type having a stem compartment 10 and a case 11 held at the upper end thereof for housing the indicating means which provide the temperature reading.

The stem 10 is in the form of a hollow, elongated metallic tube 12 having a plug 13 for hermetically sealing the free end thereof. The lower portion of the tube 12 contains a temperature-sensitive, helical, bimetallic element 14, which may comprise laminations, for example of iron and nickel chrome alloy manufactured in a manner well-known in the art. The element 14 is surrounded by a suitable silicone oil which cushions it to a considerable extent against shock and improves the response of the thermometer by reason of improving heat transfer between the element 14 and the tube 12. The upper end 14a of the element 14 is secured to a member 15 by any suitable means, as, for example, by welding. The member 15 is held in immovable relation with the stem 10 and this also can be accomplished in a number of ways such as by welding or "staking" as at 16, or in any other suitable manner. The lower portion 14b of the bimetallic element 14 is welded to one end of a rotatable staff member 17.

The upper end of the stem is fitted with a hexagonal nut 18 which is fixed to the stem tube 12 so that there can be no movement or rotation between the nut and tube. The inner side of the nut 18 is provided with an annular recess 19 for holding a sealing or O-ring 20 in contact with the back of the case 11 to provide a tight seal therebetween.

Pressure contact is achieved between the case 11 and the sealing ring 20 by means of an arrangement including a spring member 21 maintained in engagement with the inside of the case. This member 21 is shown as generally circular in shape with radial slots forming spring fingers 21a pointing inwardly. It will be clear that the spring member 21 can be of various shapes and configurations; however, it is important that it have the desired resilient characteristics. The spring fingers 21a are held in a biased position by means of a bushing 22 which has an annular flange 22a bearing against the spring fingers. The bushing 22 is inserted into the upper end of the stem tube 12 and is held in place by means of a press fit between the inner surface of the tube 12 and the outer surface of the bushing 22.

The bushing 22 has a central aperture 24 which is made sufficiently large to accommodate passage of the staff 17. The inner surface of this aperture 24 serves as a bearing seat for the staff 17 at its upper end. A circular scale plate 25, having a radially disposed temperature scale 26 calibrated for use with the particular bimetallic element 14 in the stem 10, is positioned within the case 11. The scale plate 25 is seated at its outer periphery against the inside of the case 11 and at its inner periphery against the top of the flange 22a on the bushing 22. The upper end of the staff 17 is fitted with a small pointer bushing 27 for securing a pointer 28 in fixed relationship with the staff to rotate axially with the staff so as to provide an indication of temperature in cooperation with the radially disposed scale 26 on the scale plate 25.

A front closure assembly encloses the face of the instrument and includes a bezel ring 29 which holds the scale plate 25 in engagement with the case 11. A glass window 30 is positioned to rest on the bezel ring 29 and is provided with an annular gasket 31 around its periphery. The glass plate 30 is held securely in place by means of a flanged ring 32, which is pressed tightly over the flange 11a of the case 11.

From the above description it will be clear that when the temperature varies, the bimetallic element 14 rotates the staff 17 so that the pointer 28 moves relative to the scale 26. The stem tube 12 is frictionally held in fixed relationship with the case 11 by means of the pressure exerted by spring 21 between the sealing ring 20 and the outside of the case 11 against which it is engaged.

When the thermometer no longer provides an accurate indication of the temperature condition being measured or sensed, recalibration is effected very easily by means of holding the hexagonal nut 18 with any suitable means, such as, for example, a wrench or pliers, and manually rotating the case 11. This will cause the scale plate 25 to move with respect to the pointer 28 so that recalibration can be accomplished simply by rotating the case 11 until the pointer 28 is aligned with the correct reading, as ascertained with a standard thermometer, for instance. Since the spring member 21 bears against both the movable case 11 and the relatively immovable stem bushing 22, there must also, of course, be relative motion either between the spring 21 and case 11 or between the spring fingers 21a and flange 22a. According to the exemplary design shown there is sufficient frictional engagement at the circumferential contact area between the spring 21 and the inner surface of the contact area between the spring 21 and the inner surface of the case 11 to maintain these elements in fixed relationship when the case 11 is rotated with respect to the stem 10. Movement about the rotational axis of the stem 10 is therefore effected between the flange 22a and the spring fingers 21a. However, it should be understood that so long as relative movement is provided it is not material whether it is provided between the spring 21 and case 11 or the spring 21 and flange 22a, so long as movement is allowed between the scale plate 25 and the pointer 28. It should also be understood that the shape of the spring 21 illustrated is only exemplary and that spring means of various shapes and sizes may be provided between the case 11 and stem 10 of the instrument in accordance with the teachings herein.

It will be appreciated that by means of the invention described it is now possible to recalibrate instruments in a simpler, more rapid and more convenient manner than was heretofore possible. One of the advantages of the invention is that it is no longer necessary to employ a special tool. Accordingly, the inconvenience and lost time resulting from loss or misplacement of the special tool previously required for recalibration is now eliminated. Additionally, it is no longer necessary to disassemble the instrument, as was the prior art practice, in order to carry out the recalibration operation.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense. While the invention has been described in conjunction with a thermometer instrument, it should be clearly understood that the principles taught herein are applicable to instruments of various types.

We claim:

1. In a thermometer instrument, means for calibrating said thermometer without disassembling said instrument comprising: a case, indicating means contained within said case, said indicating means including a scale disposed in fixed relationship with said case and a pointer movable with respect to said scale, a stem assembly mechanically connected at one end to said case and housing a thermally responsive element, said element being secured at one end in fixed relationship with said assembly, means connecting the other end of said element to said pointer, resilient means for maintaining frictional engagement between said case and said one end of said stem assembly to prevent movement between said case and assembly during ordinary use, and said stem assembly including holding means for holding said assembly while rotating said case to thereby cause movement between said scale and said pointer for calibrating said thermometer, said holding means includes a nut secured to said stem assembly, said nut having a recess for holding a circular compressible ring in bearing engagement with the outer surface of said case.

2. In a thermometer instrument, means for calibrating said thermometer without disassembling said instrument comprising: a case, indicating means contained within said case, said indicating means including a scale disposed in fixed relationship with said case and a pointer movable with respect to said scale, a stem assembly mechanically connected at one end to said case and housing a thermally responsive element, said element being secured at one end in fixed relationship with said assembly, means connecting the other end of said element to said pointer, resilient means for maintaining frictional engagement between said case and said one end of said stem assembly to prevent movement between said case and assembly during ordinary use, said resilient means comprises a generally disc shaped spring member having pressure contact between its outer peripheral region and the inner surface of said case and between its inner peripheral region and the one end of said stem assembly, and said stem assembly including holding means for holding said assembly while rotating said case to thereby cause movement between said scale and said pointer for calibrating said thermometer.

3. In a thermometer, means for calibrating said thermometer without disassembling said instrument comprising:
   a case having sides and a back,
   indicating means contained within said case and viewable from the front of said case,
   said indicating means including a scale disposed in fixed relationship with said case and a pointer movable with respect to said scale,
   a stem and a connecting member fixed to one end thereof,
   said connecting member being disposed in an aperture in the back of said case and having a central aperture and a flange,
   said stem having a thermally responsive element therein, said element having one of its ends secured in fixed relationship with said stem,
   mechanical means passing through the aperture in said connecting member said mechanical means connecting the other end of said element to said pointer to actuate said pointer when said element is exposed to a temperature differential,
   a holding member fixed to said one end of said stem adjacent the outer surface of the back of said case,
   said holding member having a circular recess therein,
   a compressible sealing ring contained within said recess and adapted to bear against the outer surface of the back of said case,
   and a spring member in pressure engagement with said flange and with the inner surface of the back of said case to compress said sealing ring against the outer surface of the back of said case and thereby maintain said case in non-movable engagement with said stem,
   said case being rotatable with respect to said stem when sufficient torque is applied between said case and said holding member to thereby change the position of said pointer with respect to said scale.

4. The invention as set forth in claim 3 wherein said spring member is generally disc shaped with inwardly disposed spring fingers, pressure engagement being effected between said case and said spring member adjacent its outer circumference, pressure engagement also being effected between the ends of said spring fingers and the flange on said connecting member.

References Cited in the file of this patent
UNITED STATES PATENTS

| 1,903,322 | Ames | Apr. 4, 1933 |
| 2,558,743 | Ford | July 3, 1951 |
| 2,743,613 | Kebbon | May 1, 1956 |